United States Patent
Gröning

(10) Patent No.: US 7,946,525 B2
(45) Date of Patent: May 24, 2011

(54) MATERIAL FOR ABSORBING NOISE IN AIRCRAFT

(75) Inventor: Malte Gröning, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 806 days.

(21) Appl. No.: 11/919,167

(22) PCT Filed: Apr. 28, 2006

(86) PCT No.: PCT/EP2006/004024
§ 371 (c)(1),
(2), (4) Date: Oct. 24, 2007

(87) PCT Pub. No.: WO2006/114332
PCT Pub. Date: Nov. 2, 2006

(65) Prior Publication Data
US 2009/0302154 A1     Dec. 10, 2009

(30) Foreign Application Priority Data
Apr. 28, 2005 (EP) .................................. 05009313

(51) Int. Cl.
*B64C 1/40* (2006.01)

(52) U.S. Cl. ................... 244/1 N; 244/133; 181/294

(58) Field of Classification Search ............... 244/1 N, 244/119, 133; 181/208, 200, 290, 284, 294
See application file for complete search history.

(56) References Cited

U.S. PATENT DOCUMENTS

| | | | | |
|---|---|---|---|---|
| 3,489,242 A * | 1/1970 | Gladding et al. | ............. | 181/208 |
| 4,110,510 A * | 8/1978 | Oliveira | ............. | 181/294 |
| 4,301,553 A * | 11/1981 | Noiles | ............. | 623/20.25 |
| 4,340,129 A * | 7/1982 | Salyers | ............. | 181/200 |
| 4,898,783 A * | 2/1990 | McCullough et al. | ............. | 244/1 N |
| 4,940,112 A * | 7/1990 | O'Neill | ............. | 181/290 |
| 5,504,282 A * | 4/1996 | Pizzirusso et al. | ............. | 181/290 |
| 5,965,851 A * | 10/1999 | Herreman et al. | ............. | 181/200 |
| 6,260,660 B1 * | 7/2001 | Yoerkie et al. | ............. | 181/290 |
| 7,246,772 B2 * | 7/2007 | Drost et al. | ............. | 244/119 |
| 7,410,126 B2 * | 8/2008 | Drost | ............. | 244/119 |
| 7,674,838 B2 * | 3/2010 | Lim et al. | ............. | 521/77 |

* cited by examiner

*Primary Examiner* — Galen Barefoot
(74) *Attorney, Agent, or Firm* — Medlen & Carroll, LLP

(57) ABSTRACT

The invention relates to a material for absorbing noise in aircraft, comprising at least one barrier layer and at least one absorptive layer. The barrier layer is provided with an elastomeric material having a minimum specific density of 1 and a mass per unit area of 1.3 kg/m² or less while the absorptive layer is equipped with a porous and/or open-cell material having a weight per volume of 4 to 50 kg/m³, preferably 10 to 40 kg/m³, more preferably 15 to 35 kg/m³ even more preferably 20 to 30 kg/m³. The mass per unit area of the sound-absorbing material amounts to 2 kg/m² or less.

23 Claims, 1 Drawing Sheet

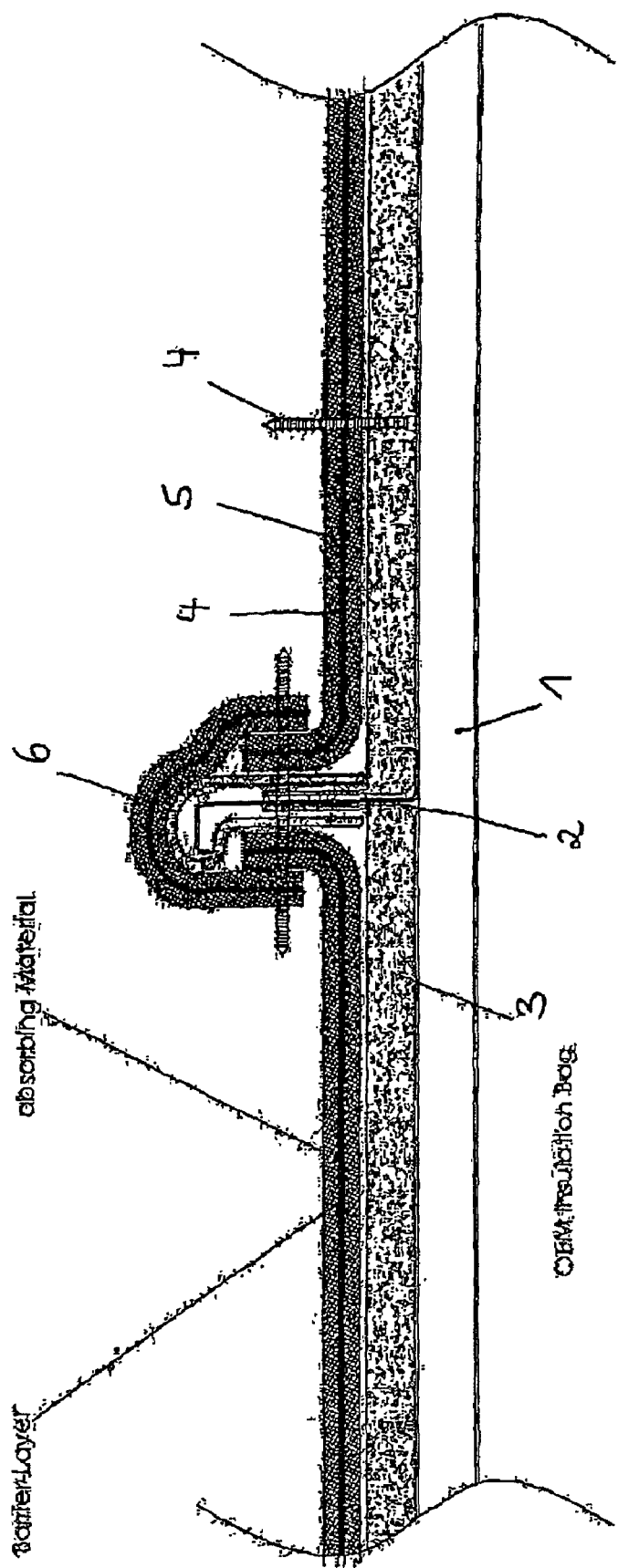

MATERIAL FOR ABSORBING NOISE IN AIRCRAFT

The invention relates to a sound-deadening material for insulation in aircraft, with at least one barrier layer and with at least one absorption layer.

The cabin of commercial aircraft with jet engines is subject to a relatively high level of noise during the flight, and this is substantially attributable to the noise caused by flow of, sometimes turbulent, air flowing past the outer skin, and to noises caused by the engines.

In principle, it is possible to provide sound-deadening material, in particular at the outer skin of an aircraft. This type of sound-deadening is generally provided in business jets or VIP jets, but not in commercial aircraft, in which the reduction in payload resulting from the sound-deadening material is not generally acceptable on economic grounds.

The invention is based on the object of providing a sound-deadening material for insulation in aircraft which, combined with less weight, permits effective sound-deadening, in particular of sound caused by air as it flows past the aircraft.

The inventive sound-deadening material with at least one barrier layer and with at least one absorption layer has the following features:
  a) the barrier layer comprises an elastomer material with specific gravity of at least 1 and with weight per unit area of 1.3 kg/m² or less,
  b) the absorption layer comprises a porous and/or open-cell material with density of from 4 to 50 kg/m³, preferably from 10 to 40 kg/m³, more preferably from 15 to 35 kg/m³, with greater preference from 20 to 30 kg/m³,
  c) the weight per unit area of the sound-deadening material is 2 kg/m or less.

The inventive material has a multilayer structure and has at least two layers. The barrier layer comprises an elastomer material, in particular an elastomeric plastic, with specific gravity of at least 1 and with weight per unit area of 1 kg/m² or less. The entire sound-deadening material has flexibility which is sufficient for its application at the intended site of application in the aircraft (in particular at the outer wall), and to replicate any curvature of the outer wall at that site. The term elastomer material therefore designates any material which is sufficiently flexible to meet these criterion. The elastomer material has relatively high specific gravity and therefore serves as barrier layer for incident sound.

The sound-deadening material also has a sound-absorption layer with a porous and/or open-cell material. This material has very low density, from 4 to 15 kg/m³. Porous and/or open-cell means that the material has cavities connected to the surface, and may involve a foam or a fiber material, for example.

The weight per unit area of the entire sound-deadening material in the invention is 2 kg/m² or less.

The invention has found that for effective sound-deadening, it is not necessary that the sound-deadening material has the high weight that was hitherto deemed necessary, associated with high weight per unit area. In the invention, it is sufficient that the specific gravity of the barrier layer is relatively high, at least 1, but this layer is very thin, the result being a weight per unit area not exceeding 1.3 kg/m². The weight per unit area is preferably 1.1 kg/m² or less. From 0.8 to 1.2 kg/m² is a preferred range of weight per unit area of the barrier layer.

The invention combines the barrier layer with an absorption layer with very low density in the range from 4 to 50 kg/m³.

The inventive thin barrier layer combined with the absorption layer with very low density gives sufficiently good sound-deadening while the total weight per unit area of the sound-deadening material is very low. The sound-deadening material is particularly suitable for insulation of the frontal region of the cabin of commercial aircraft, this being the region that normally accommodates first class or business class. The level of noise in the frontal region of the cabin is very generally only determined to a small extent by noise from the engines, since conventional commercial aircraft have the engines suspended on the wings and/or in the region of the tail. A more important cause of most of the noise is noise caused by flow of external air past the aircraft. The frequency of these noises caused by flow is in particular in the range from 0.5 to 8 kHz, and the inventive sound-deadening material exhibits particularly good insulation in this frequency range. The frequency of the noise caused by the engines is generally markedly smaller. The invention is therefore also based on the finding that the inventive sound-deadening material is particularly suitable for insulation with respect to noise in the frequency range from 0.5 to 8 kHz, and that effective insulation here does not require the high mass or the high weight per unit area which was hitherto deemed necessary.

The specific gravity of the elastomer material of the barrier layer is preferably from 1 to 1.5, particularly preferably in the range from 1.2 to 1.3. The thickness of the barrier layer is preferably from 0.5 to 1.3 mm, more preferably from 0.6 to 1.0 mm. It can be produced from conventional elastomer materials, for example polysiloxanes, polychloroprenes, and polyvinyl esters.

The thickness of an absorption layer is preferably from 2 to 20 mm, more preferably from 6 to 15 mm, particularly preferably from 8 to 12 mm. The porous and/or open-cell material can be a fiber material, for example felt, a woven textile, or a knitted textile. A glassfiber material can be involved here.

As an alternative, the porous and/or open-cell material can be a lightweight foam. The total weight per unit area of the sound-deadening material is preferably 1.7 kg/m² or less, more preferably 1.5 kg/m² or less.

In the invention, the sound-deadening material can have a barrier layer and an absorption layer, or as an alternative there can be a barrier layer arranged centrally and two absorption layers arranged on the two sides of this barrier layer. The sound-deadening achieved by the inventive sound-deadening material is preferably at least 4 dB/SIL, more preferably at least 5 dB/SIL. "dB/SIL" indicates the sound-deadening effect perceived physiologically by persons in relation to what are known as speech interference levels.

The inventive material can have, at one or more edges, edge regions in which the thickness of the absorption layer has been reduced, compared with the thickness in the central regions. This design makes it easier to install the sound-deadening material in the manner described in more detail below.

The various layers of the inventive sound-deadening material can be connected in a known manner, for example adhesive-bonded. It is, however, also possible in the invention that these layers are merely placed together, and then that a mat of the inventive material is provided with a foil sheath, which provides the structural integrity of the mat. A conventional plastics foil, such as Mylar, can be involved here.

The invention further provides an aircraft in which at least one subregion of the outer skin has been insulated on the inner side with an inventive sound-deadening material.

It is preferable that at least one axial subsection of the outer skin (preferably a frontal region of the outer skin and, associated therewith, a frontal region of the cabin) has insulation running radially around the entire periphery. The entire periphery of the outer skin has therefore been insulated in the corresponding axial section of the cabin. As an alternative, it can be that, in this region of the cabin, the entire outer skin is not insulated, but instead another region completely radially enclosing the passenger region is insulated, an example being a portion of the outer skin and an intermediate floor of the cabin. This method permits arrangement of an uninsulated freight region or uninsulated functional region below the insulated passenger region. In the case of large commercial aircraft having two or more decks within the cabin (for example the Airbus A380) it is equally conceivable to insulate the outer skin only in the upper region, and then to insulate the intermediate floor between the two cabin decks. This method provides insulation only in the upper region where the usual arrangement has first class.

The inventive aircraft is preferably a commercial aircraft, and this term designates conventional commercial aircraft which are used by airlines or air charter companies. Its number of passenger seats is preferably at least 80, preferably at least 100, more preferably at least 200, with more preference at least 300.

To ensure its structural integrity, an aircraft fuselage usually has radially running frames to which the outer skin has been applied. For effective insulation of the inner side of the outer skin, it is preferable that the sound-deadening material has not only been arranged in the region of the outer skin between the frames but also likewise covers these. In this connection, it is preferable that sound-deadening mats have a central region whose width corresponds to the axial distance between two frames. Next to this central region of the mat, there are flexible marginal regions in which the thickness of the absorption layer has been reduced. The mat is inserted between two frames in such a way that the thick central region is in contact with the outer skin between the frames and the thinner marginal regions extend at an angle of about 90 degrees with respect to the thicker central region and are in contact with the axial areas of the frames. The invention can also provide that there are also bridging strips composed of inventive sound-deadening material which are elastically deformed in approximately U-shaped manner, and which are connected, for example adhesive-bonded, to those marginal regions of the sound-deadening mats that are in contact with the frames. The bridging strips thus cover those edges of the frames that face toward the inner side of the cabin.

An inventive example of the invention is described below, using the drawing.

Frames 2 running in the radial direction have been arranged at regular distances at the inner side of the outer wall 1 of an aircraft cabin. Thermal insulation 3 has been applied to the inner side of the outer wall 1. The material 3 has been secured by means of pins 4 attached to the outer wall 1, or has been pressed onto these pins.

The inventive sound-deadening material has likewise been pressed onto these pins 4. It comprises a polysiloxane layer 5 of thickness 0.7 mm (Durasonic 5004 from Duracote) with specific gravity of 1.671 and with weight per unit area of 1.17 kg/m$^2$. Glassfiber-material layers 4 each of thickness 9.5 mm and of density 24 kg/m$^3$ have been arranged on the two sides of the polysiloxane layer 5, the weight per unit area of these two fiber layers therefore together being 0.46 kg/m$^2$.

In the region of the frames 2, a soundproof connection has been provided between adjacent sound-deadening mats via a sound-deadening material 6 which has inventive structure and which bridges the inner edges of the frames.

The embodiment shown has absorption layers arranged on the two sides of the barrier layer, and the weight per unit area of the sound-deadening material is 1.63 kg/m$^2$. If there is only one absorption layer covering the barrier layer, the weight per unit area can be reduced to 1.39 kg/m$^2$.

What is claimed is:

1. A sound-deadening material for insulation in aircraft, with at least one barrier layer and with at least one absorption layer, characterized by the following features:
    a) the barrier layer comprises an elastomer material with a specific gravity of between 1 and 1.3, and with weight per unit area of 1.3 kg/m$^2$ or less,
    b) the absorption layer comprises a porous and/or open-cell material with density of from 4 to 50 kg/m$^3$,
    c) the weight per unit area of the sound-deadening material is 2 kg/m$^2$ or less.

2. The sound-deadening material as claimed in claim 1, wherein the absorption layer comprises a porous and/or open-cell material with density of from 10 to 40 kg/m$^3$.

3. The sound-deadening material as claimed in claim 1, characterized in that the thickness of the barrier layer is from 0.5 to 1.5 mm.

4. The sound-deadening material as claimed in claim 1, characterized in that the elastomer material has been selected from the group consisting of polysiloxanes, polychloroprenes, and polyvinyl esters.

5. The sound-deadening material as claimed in claim 1, characterized in that the thickness of an absorption layer is from 2 to 20 mm.

6. The sound-deadening material as claimed in claim 1, characterized in that the porous and/or open-cell material is a fiber material.

7. The sound-deadening material as claimed in claim 6, characterized in that the porous and/or open-cell material has been selected from the group consisting of felt, woven textiles, and knitted textiles.

8. The sound-deadening material as claimed in claim 6, characterized in that the fiber material comprises glass fibers.

9. The sound-deadening material as claimed in claim 1, characterized in that the porous and/or open-cell material is a foam.

10. The sound-deadening material as claimed in claim 1, characterized in that the weight per unit area of the sound-deadening material is 1.7 kg/m$^2$ or less.

11. The sound-deadening material as claimed in claim 1, wherein the absorption layer comprises a porous and/or open-cell material with density of from 15 to 35 kg/m$^3$.

12. The sound-deadening material as claimed in claim 1, characterized in that it comprises a barrier layer and two absorption layers arranged on the two sides of the barrier layer.

13. The sound-deadening material as claimed in claim 1, characterized in that its insulation value is at least 4 dB/SIL.

14. The sound-deadening material as claimed in claim 1, characterized in that it has, at one or more edges, edge regions in which the thickness of the absorption layer has been reduced.

15. The sound-deadening material as claimed in claim 1, characterized in that it also comprises a foil sheath.

16. An aircraft, characterized in that at least one subregion of the outer skin has been insulated on the inner side with a sound-deadening material as claimed in any of claims 1 to 15.

17. The aircraft as claimed in claim 16, characterized in that at least one axial subsection of the outer skin has insulation running radially around the entire periphery.

18. The aircraft as claimed in claim 17, characterized in that a subregion of the outer skin has been insulated, arranged in the forward half.

19. The aircraft as claimed in claim 16, characterized in that it is a commercial aircraft.

20. The aircraft as claimed in claim 19, characterized in that its number of passenger seats is at least 80.

21. The aircraft as claimed in claim 16, characterized in that it has been insulated with a sound-deadening material as claimed in claim 14, where this sound-deadening material has, at two opposite margins, marginal regions in which the thickness of the absorption layer has been reduced; where the width of the sound-deadening material between two such marginal regions corresponds approximately to the distance between two frames of the outer skin; where in each case sections of the sound-deadening material are inserted between two frames, and where the marginal regions in which the thickness of the absorption layer has been reduced are in contact with those areas of the frames which face in the axial direction.

22. The aircraft as claimed in claim 21, characterized in that bridging strips of sound-deadening material have also been provided and, overlapping with the sound-deadening material inserted between the frames, cover those edges of the frames which face in the radial direction.

23. The sound-deadening material as claimed in claim 1, wherein the absorption layer comprises a porous and/or open-cell material with density of from 20 to 30 kg/m$^3$.

* * * * *